(No Model.) 3 Sheets—Sheet 2.
G. WASSERMANN.
MACHINE FOR FILLING SAUSAGE GUTS.
No. 475,367. Patented May 24, 1892.
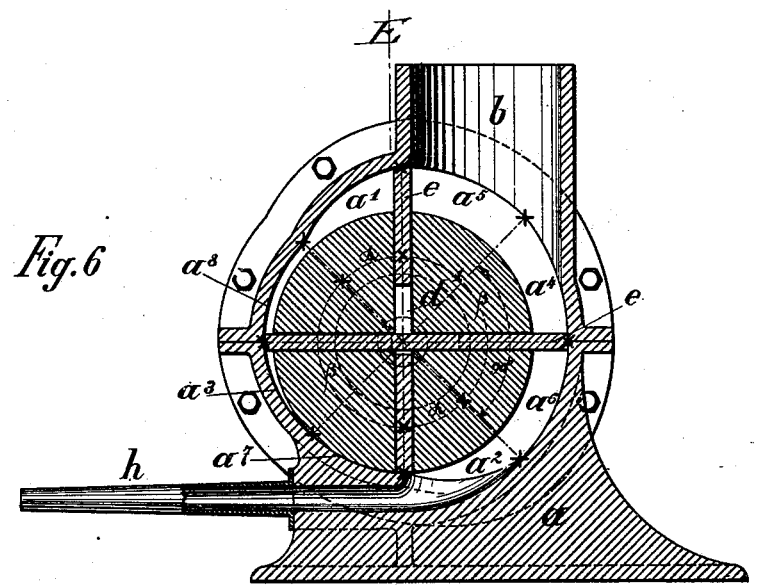
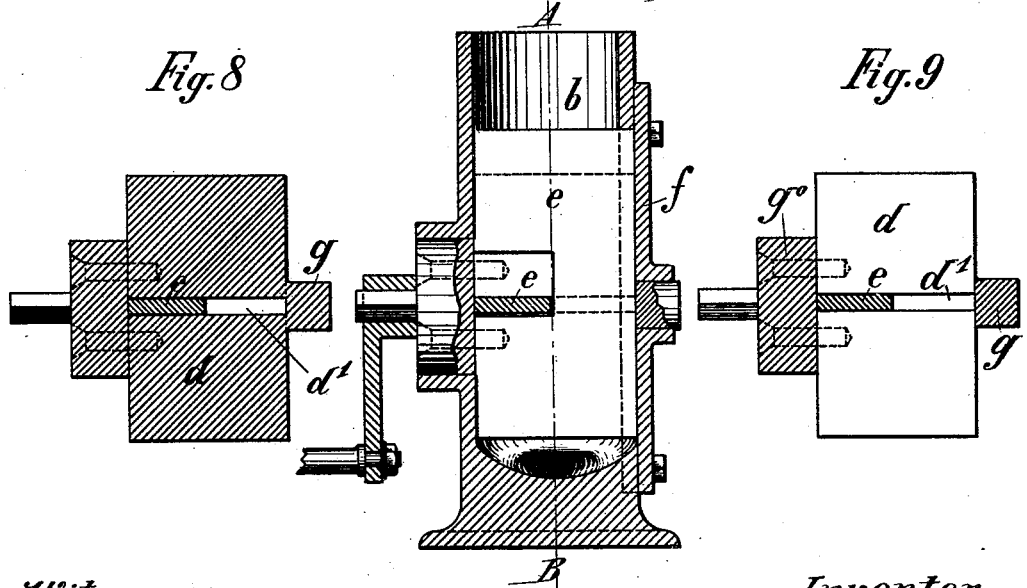
Witnesses:
Moritz Keith
Waldemar Bratt
Inventor:
Georg Wassermann:
by Emil Blum
Attorneys.

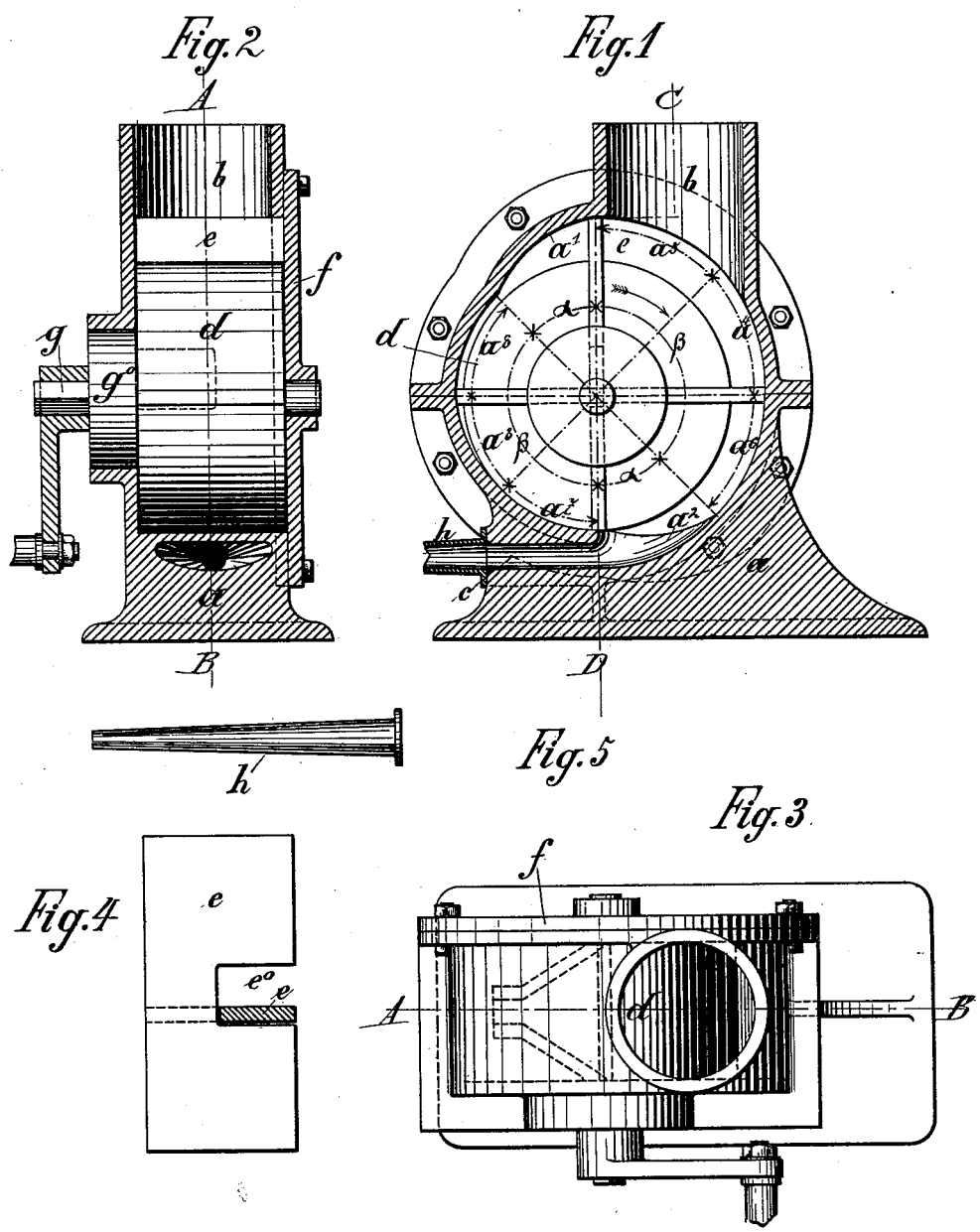

(No Model.) 3 Sheets—Sheet 3.
G. WASSERMANN.
MACHINE FOR FILLING SAUSAGE GUTS.
No. 475,367. Patented May 24, 1892.
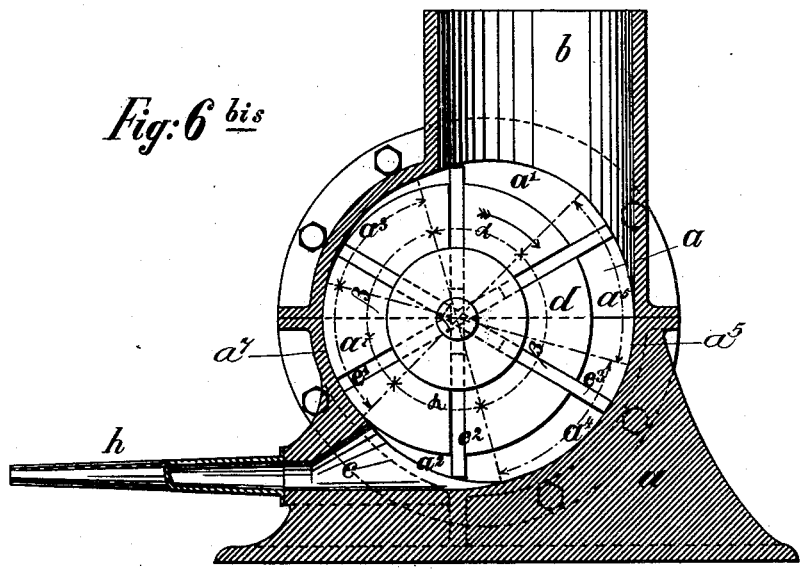
Fig: 6 bis
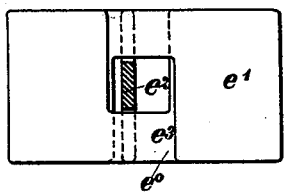
Fig: 7 bis
Witnesses:
Moritz Keith
Waldemar Brock.
Inventor:
Georg Wassermann:
by Emil P Stern
Attorneys:

UNITED STATES PATENT OFFICE.

GEORG WASSERMANN, OF HOTTINGEN, ASSIGNOR TO G. BÄUERLEIN-GERMANN, OF UNTERSTRASS, ZURICH, SWITZERLAND.

MACHINE FOR FILLING SAUSAGE-GUTS.

SPECIFICATION forming part of Letters Patent No. 475,367, dated May 24, 1892.

Application filed January 29, 1890. Serial No. 338,469. (No model.)

*To all whom it may concern:*

Be it known that I, GEORG WASSERMANN, a citizen of the Swiss Republic, residing at Hottingen, Zurich, Switzerland, have invented a new and useful Machine for Filling Sausage-Guts, of which the following is a full, clear, and exact description.

This new machine for filling hose-shaped receptacles, as guts and the like, is based on the well-known cynematic system of rotating or circular motion. The material is fed into a funnel at the upper side and is discharged at the bottom part. The peculiar character of the material used for sausage makes it necessary, in order to obtain a perfect compact filling, to give a peculiar shape to the walls facing the pressing-blades.

In the annexed drawings, which form a part of this specification, Figure 1 illustrates a vertical section of the machine on the line A B of Fig. 3, showing its main features, the rotating body being shown in side elevation. Fig. 2 shows a vertical section at right angles of Fig. 1 on the line C D, the rotating body being shown in side elevation. Fig. 3 shows a plan view of the machine. Fig. 4 shows the rotating body's pressing-blades on the line C D of Fig. 1, only one of the blades being in cross-section. Fig. 5 shows the tube through which the material is stuffed into the guts. Fig. 6 shows a vertical section of the machine on the line A B of Fig. 3, the rotating body being also in section. Fig. 7 shows a vertical section at right angles to Fig. 6 (or 1) on the line C D of Fig. 1, the rotating body containing the pressing-blades being in section. Fig. 8 shows a section through the rotating body and a blade on the line E F of Fig. 6. Fig. 9 shows a section through the slit of the rotating body on the line C D of Fig. 1. Figs. $6^{bis}$ and $7^{bis}$ show a modified construction of the machine—viz., Fig. $6^{bis}$ a vertical section, and Fig. $7^{bis}$ the combination of three pressing-blades.

The principal parts of the machine are the casing $a$, provided with the filling-funnel $b$, and the discharge or stuffing outlet $c$, the rotating body $d$, and the pressing-blades or pressing-shovels $e$ inserted therein, which project so far from the rotating body $d$ as to form a connection between the circular surface of this body and the inside peripherical wall of the casing $a$.

The casing $a$ is built so that its radius is shortened between the feeding-funnel $b$ and the outlet $c$. The totals of two radii placed in one straight line are constant and equal to the length of the pressing-blades.

My improvement relates especially to the characteristic arrangement of the casing $a$.

The peripheric interior of the casing $a$, Fig. 1, is divided in four main parts or segments—namely, in the two radial main parts, one small and the other large and corresponding to the angles $\beta$ and in the two segments forming transitions between the small and large main parts, these transition-segments corresponding to the angles $a$. In the first two main parts the blades are entirely or nearly entirely pushed back or entirely (or nearly so) projecting—that is to say, in the pressing position. The pressing-blades $e$ are in this position approximately between the commencement of the opening of the filling-funnel and the discharge-opening. The transition-segment $a'$ is situated approximately over the discharge-opening. The inside walls of the casing facing each the angle $\beta$ are preferably arranged with a slight eccentric curve over a part of their length for the following reason. As soon as the pressing-blades which have arrived at the curve $a^2$ slide back into the rotating body $d$ the material placed before the discharge-opening will get somewhat less compact, and in order to readjust this increase of volume that part of the wall of the casing where the next following blade is moving must present a corresponding sloping or shortening. This sloping part of the inside wall is shown at $a^4$, Figs. 1 and 6, and has the same angle withal as the part $a^2$ and the diametrically-opposed part $a^3$. To the left and right sides of the parts $a^3$ and $a^4$ are arranged concentric parts reaching to the transition-segments $a'$ and $a^2$.

The two pressing-blades $e$ slide into slits $d'$, placed at right angles in the rotating body $d$ and have in their middle lateral recesses $e°$, so that the blades can slide in and out as required by the shape of the casing. (See Figs. 1, 2, 4, 6, 7, and 9.)

The pressing-blades, Figs. 4 and 7, are governed directly by the inside wall of the casing, as shown in Figs. 1, 2, and 6. A special groove can also be provided for this purpose, but this would complicate the device without any practical use. The cover $f$ closes directly one end face of the rotating body $d$.

$g$ is the axle of the rotating body $d$ (see Figs. 7 to 9) for the easy introduction of the blades $e$. The shoulder-plate $g°$ is screwed upon $d$. On the drawings I have shown a hand-crank for operating the machine, but any other suitable motor can of course be employed.

The stuffing-tube $h$ is shown in Figs. 1, 5, and 6, and is conically narrowed, as in the usual sausage-gut-filling machines, and gives the final shape to the matter filled into the gut-casings. On the same principle three pressing-blades may be used instead of two, as shown diagrammatically in Figs. $6^{bis}$ and $7^{bis}$. The lateral recesses in the middle are arranged somewhat deeper for two blades $e'$ and $e^3$, and the third blade $e^2$ has recesses on both sides. The transition-segment $a'$ is somewhat nearer to the filling-funnel in consequence of the merely constructive proportions of space, as the transition-segment $a^2$ corresponds in length nearly to the distance between the blades. The sloping part of the inside wall is located on the segment $a^4$, between $a^2$ and the concentric part of the large radius, and the corresponding part $a^3$ is located between $a'$ and the concentric part of the smaller radius. It must therefore be well noticed that both the curves $a^2 a^4$ and $a^3 a'$, corresponding in angle and in radial increase, are, however, differing in the kind of this radial increase, said radial increase being much stronger or more intense at the commencement of $a^2 a^4$ (see $a^2$) than the radial increase of $a^3 a'$ at the commencement of this latter curve (see $a^3$). Reciprocally the increase of the end $a^4$ of the transition-segment $a^2 a^4$ is corresponding with the increase of the commencement $a^3$ of the transition-segment $a^3 a'$.

Having fully described my invention, what I claim as new, and desire to secure by Letters Patent, is—

In a machine for filling sausage-guts, the combination, with a pressing rotating body $d$, having pressing-blades sliding in slits of the body $d$, of a casing $a$, provided with a filling-funnel and stuffing-tube and having an inner wall divided into segments, the one $a^7$ of these segments having a small radius and being opposite to a segment $a^5$ of greater radius, each of them being neighbor to a transition-segment $a'$ and $a^2$, respectively, and to a sloping segment $a^3$ and $a^4$, respectively, this latter being for the purpose of readjusting the increase of volume when the pressing-blade is passing over the transition-segment $a^2$, substantially as hereinbefore described and set forth.

In testimony whereof I hereunto sign my name, in the presence of two subscribing witnesses, this 2d day of December, 1889.

GEORG WASSERMANN.

Witnesses:
EMIL BLUM,
H. LABHART.